O. NELSON.
GREASE SCOOP AND GUN.
APPLICATION FILED MAY 14, 1919.
1,325,573.
Patented Dec. 23, 1919.
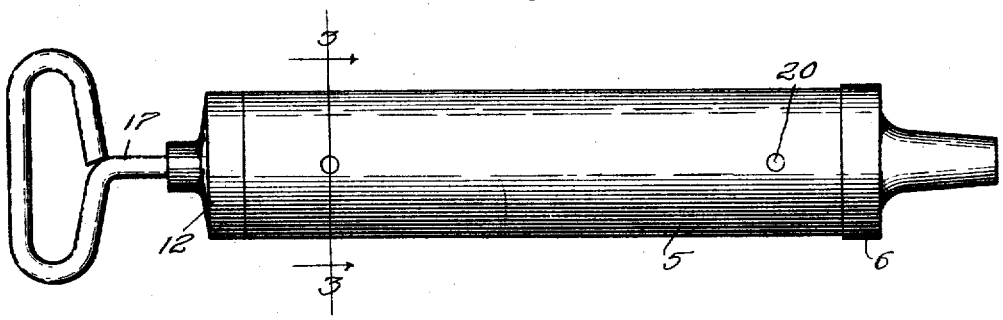
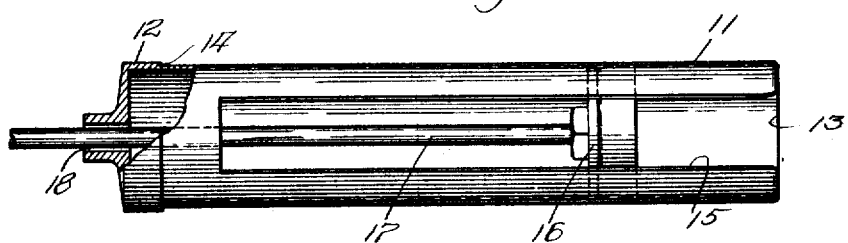
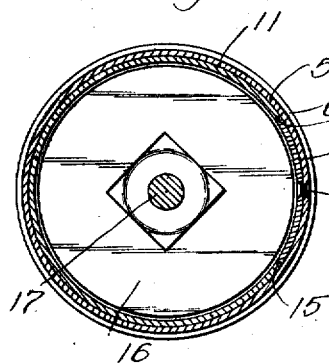
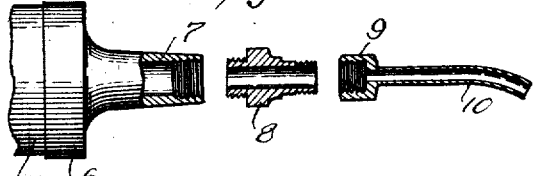

UNITED STATES PATENT OFFICE.

OTTO NELSON, OF CHICAGO, ILLINOIS.

GREASE SCOOP AND GUN.

1,325,573.  Specification of Letters Patent.  Patented Dec. 23, 1919.

Application filed May 14, 1919. Serial No. 297,047.

*To all whom it may concern:*

Be it known that I, OTTO NELSON, a citizen of the United States, residing at Chicago, in the county of Cook and State of Illinois, have invented certain new and useful Improvements in Grease Scoops and Guns, of which the following is a specification.

My invention relates to means for scooping up and forcing oil, solid oil, grease, or the like, into grease cups or other desirable places.

One of the objects of my improvement is the provision of simple and efficient means whereby a part of the device may be utilized as a scoop for scooping up the oil, grease, or the like, and a casing for the scoop with a piston for forcing the grease out of the casing into grease cups, and the like.

A further object is the provision of simple and efficient means for easily and quickly filling a grease gun, or the like.

Other objects will appear hereinafter.

An embodiment of my invention is shown in the accompanying drawing, forming a part of this specification, and in which—

Figure 1 is a side view of a grease scoop and gun embodying my invention;

Fig. 2 is a side view of the scoop and piston part of the device with a portion broken away to show a bearing for the piston rod;

Fig. 3 is an enlarged view taken on line 3—3 of Fig. 1; and

Fig. 4 is a fragment showing the discharge end of the casing and members for reducing the size of the discharge opening or nozzle.

Referring more particularly to the drawing, I have indicated a casing 5 of cylindrical form with a closure 6 at one end. The closure 6 is provided with an extension in which is a discharge opening or orifice 7. In order to vary the size of the opening 7 a member 8 is provided with threads and adapted to engage suitable threads in opening 7. Where it is desirable to still reduce the size of the opening 7 a member 9 may be threaded on the end of member 8. It is convenient to have a tube 10 extending from the member 9 for conducting grease, or the like, to places difficult to reach.

The end of the casing 5, opposite the closure 6, is open and in the open end extends a scoop 11. One end of the scoop 11 is closed by a closure 12, and the other end 13 is left open. The member 12 is preferably formed so that a shoulder 14 engages the open end of the casing 5 when the device is assembled. Extending from the open end 13 of the scoop is an opening 15 which extends throughout the greater part of the length of the scoop, and the length of this opening may be varied as desired. The sides of the opening are preferably parallel, as indicated.

Mounted in the scoop 11 is a piston 16 to which is attached a piston rod 17, and the latter extends out through a bearing 18 in the closed end 12 of the scoop. The bearing opening 18 is preferably of such a size as to permit air to pass out around the piston rod 17 when the piston 16 is moved toward the closed end 12 and to permit air to pass into the scoop behind the piston when the latter is moved toward the end 13, when the device is assembled.

On the inner wall of the casing 5 is a member 19 of substantially the same thickness as the thickness of the material in the scoop and formed to substantially fill the opening 15. This member or projection 19 is attached to the inner wall of the casing 5 so that when the scoop 11 is removed from the casing, the edges of the opening 15 slide along the edges of the projection or member 19. The device is so arranged that the inner exposed side of member 19 is in substantially a cylinder with the bore of the scoop so that the piston 16 has substantially a smooth cylindrical surface to engage. The member 19 may be formed in any desirable manner and attached to the casing in any desirable manner, such as by rivets 20. In practice I find it convenient to cut out a portion of the tube from which the scoop 11 is made and fasten this cut-out portion to the casing 5 to form the projection 19.

In use the scoop is withdrawn from the casing 5 and dipped into a vessel containing the oil or grease to be used in the device and then inserted in the casing, the piston 16, of course, is moved up near the head 12. The device is then placed so that the grease or oil will be forced out of the opening 7 into the desired receptacle, such as a grease cup, and the piston rod 17 pressed toward the end 13 of the scoop to force the oil or grease out through the opening 7. Since the inner surfaces of member 19 and scoop 11 are smooth, the piston 16 may be rotated in the device and always maintain a tight joint between its periphery and the adjacent surfaces.

I claim:—

1. A device of the kind described comprising a casing; a scoop in and substantially filling the inner contour of said casing, said scoop having an opening in its side; and a member in and substantially filling said opening and attached to the casing.

2. A device of the kind described comprising a tubular casing open at one end; a scoop telescoped in the casing and having an opening in its side; a member attached to the inner wall of the casing and substantially filling the opening of the scoop; and a piston mounted in the scoop and engaging said member.

3. A device of the kind described comprising a tubular casing; a scoop having its outer side fitting the bore of the casing and an opening in its side with the longitudinal edges of the opening substantially parallel; a member of substantially the thickness of the scoop disposed in and filling said opening and attached to the inner wall of the casing; and a piston mounted in the scoop and engaging said member.

4. A device of the kind described comprising a scoop of substantially uniform cross-section throughout its length and having an opening in its side; a casing telescoped over the scoop; a projection on the inner wall of the casing disposed in and substantially filling the opening of the scoop, the inner wall of the scoop and the exposed side of said projection being substantially in a common cylinder; and a piston in the scoop fitting against said projection.

5. A device of the kind described comprising a substantially cylindrical scoop with one end closed and the other end open and with an opening in its side extending from said open end; a casing having one end closed and the other end open with a discharge opening in the closed end; a projection on the inner wall of the casing extending into and substantially filling the opening in the side of said scoop, the inner wall of the projection being in substantially the same cylinder with the bore of the scoop; a piston in the scoop; and a piston rod attached to the piston and extending through the closed end of said scoop.

6. A device of the kind described comprising a casing open at one end and having a discharge opening at its other end; a plurality of reducing members fitted in said discharge opening for varying the sizes of the latter; a scoop telescoped in the casing with one end closed and an opening in its side; a piston in said scoop; a piston rod connected with the piston and extending out of said scoop for operating said piston; and a projection on the inner wall of the casing extending into the opening in said scoop and engaging said piston.

In testimony whereof I have signed my name to this specification on this 9th day of May, A. D. 1919.

OTTO NELSON.